US012684310B2

(12) United States Patent
Frey et al.

(10) Patent No.: US 12,684,310 B2
(45) Date of Patent: Jul. 14, 2026

(54) METHOD AND ARRANGEMENT FOR THE REPRESENTATION OF TECHNICAL OBJECTS

(71) Applicant: Siemens Schweiz AG, Zürich (CH)

(72) Inventors: Christian Frey, Unterägeri (CH);
Oliver Zechlin, Zug (CH)

(73) Assignee: SIEMENS SCHWEIZ AG, Zurich (CH)

( * ) Notice: Subject to any disclaimer, the term of this patent is extended or adjusted under 35 U.S.C. 154(b) by 439 days.

(21) Appl. No.: 17/632,884

(22) PCT Filed: Jul. 17, 2020

(86) PCT No.: PCT/EP2020/070317
§ 371 (c)(1),
(2) Date: Feb. 4, 2022

(87) PCT Pub. No.: WO2021/023499
PCT Pub. Date: Feb. 11, 2021

(65) Prior Publication Data
US 2022/0272491 A1     Aug. 25, 2022

(30) Foreign Application Priority Data

Aug. 7, 2019    (DE) ..................... 10 2019 211 871.2

(51) Int. Cl.
*H04W 4/33*        (2018.01)
*G01C 21/20*       (2006.01)
*H04W 4/029*       (2018.01)

(52) U.S. Cl.
CPC .......... *H04W 4/029* (2018.02); *G01C 21/206* (2013.01); *H04W 4/33* (2018.02)

(58) Field of Classification Search
CPC ......... H04W 4/02; H04W 4/029; H04W 4/33; H04W 4/80
(Continued)

(56) References Cited

U.S. PATENT DOCUMENTS

RE45,980 E  *  4/2016  Ohnishi ................. G08C 17/00
9,978,149 B1 *  5/2018  Zhang ....................... G06T 7/73
(Continued)

FOREIGN PATENT DOCUMENTS

CN        104246434 A    12/2014  ............. G01C 21/20
DE   10 2012 221 921      6/2014  ............. H04W 64/00
(Continued)

OTHER PUBLICATIONS

Search Report for International Application No. PCT/EP2020/070317, 13 pages, Nov. 6, 2020.
(Continued)

*Primary Examiner* — Joseph Arevalo
(74) *Attorney, Agent, or Firm* — Slayden Grubert Beard PLLC

(57) ABSTRACT

Method and arrangement for the output of location-specific information, in particular in buildings, on a mobile communication terminal of a user, wherein the location position of the mobile communication terminal is determined; and wherein location-specific information is provided as a function of the location position on the mobile communication terminal by means of a server connected via data technology with the mobile communication terminal and configured accordingly.

18 Claims, 2 Drawing Sheets

Determining the location position of the mobile communication terminal — VS1

Providing location-specific information as a function of the location position on the mobile communication terminal by means of a server connected via data technology with the mobile communication terminal and configured accordingly — VS2

(58) Field of Classification Search
USPC ...... 455/456.1, 404.2, 456.6, 406, 418, 446, 455/63.4, 456.3, 41.3, 67.11, 41.2
See application file for complete search history.

(56) References Cited

U.S. PATENT DOCUMENTS

| | | | | |
|---|---|---|---|---|
| 10,395,117 | B1* | 8/2019 | Zhang | G01C 21/1656 |
| 10,824,923 | B1* | 11/2020 | Forster | G06V 20/00 |
| 11,257,226 | B1* | 2/2022 | Solh | G06N 3/09 |
| 2009/0241040 | A1 | 9/2009 | Mattila | 715/760 |
| 2009/0312871 | A1* | 12/2009 | Lee | G01S 5/163 |
| | | | | 901/1 |
| 2012/0182180 | A1* | 7/2012 | Wolf | G01S 5/145 |
| | | | | 342/357.29 |
| 2013/0303193 | A1 | 11/2013 | Dharwada | H04W 4/043 |
| 2015/0015609 | A1 | 1/2015 | Plasse et al. | 345/633 |
| 2015/0094083 | A1* | 4/2015 | Ngo | H04W 4/029 |
| | | | | 455/456.1 |
| 2015/0126223 | A1 | 5/2015 | Lee | H04W 4/04 |
| 2017/0256097 | A1 | 9/2017 | Finn | G06T 19/00 |
| 2019/0007809 | A1* | 1/2019 | Frey | G01S 1/68 |
| 2019/0327448 | A1* | 10/2019 | Fu | G08B 3/10 |
| 2019/0392635 | A1* | 12/2019 | Ma | G01C 21/3841 |
| 2020/0192366 | A1* | 6/2020 | Levinson | G01S 15/931 |
| 2022/0117456 | A1* | 4/2022 | Xue | G01C 21/387 |
| 2022/0415154 | A1* | 12/2022 | Kim | G08B 21/0407 |

FOREIGN PATENT DOCUMENTS

| | | | |
|---|---|---|---|
| DE | 10 2017 120 435 | 3/2019 | G01C 21/04 |
| WO | WO-2008013355 A1 * | 1/2008 | G01C 21/00 |

OTHER PUBLICATIONS

Charles Woodward et al: "Implementation And Evaluation Of A Mobile Augmented Reality System For Building Maintenance"; Proceedings Of The 14th International Conference On Construction Applications Of Virtual Reality; Dawood N. And Alkass S. (Eds.). Seiten 306-315; XP055701498; Zusammenfassung Sections 4 and 5, Nov. 18, 2014.

Wikipedia:"Standortbezogene Dienste"; Online Enzyklopädie; Version vom; https://de.wikipedia.org/w/index.php?title=Standortoezogene_Dienste, May 5, 2019.

Chinese Office Action, Application No. 202080056018.7, 9 pages, Nov. 7, 2023.

* cited by examiner

METHOD AND ARRANGEMENT FOR THE REPRESENTATION OF TECHNICAL OBJECTS

CROSS-REFERENCE TO RELATED APPLICATIONS

This application is a U.S. National Stage Application of International Application No. PCT/EP2020/070317 filed Jul. 17, 2020, which designates the United States of America, and claims priority to DE Application No. 10 2019 211 871.2 filed Aug. 7, 2019, the contents of which are hereby incorporated by reference in their entirety.

TECHNICAL FIELD

The present disclosure relates to information management. Various embodiments may include methods and/or arrangements for the output of location-specific information, in particular in buildings, on a mobile communication terminal of a user.

BACKGROUND

The service life/useful life of a building in most cases involves a number of decades. Even if technical plans exist or existed, these must be able to be located and read. Furthermore, these plans should also correspond to the true environment and the current set-up in the building ("as build", "as modified over time"), in other words should have been updated according to changes. Furthermore, digital plans require suitable software and operating knowledge in order to be able to use the contents of these digital plans.

Technical documentation for a building is often not available or not currently available. It is often not possible to use technologies such as augmented reality for the overlaid display of changes, since the up-to-dateness and quality of the building data required herefor are not provided. Furthermore, technologies such as augmented reality require corresponding hardware and software and user training. On-site inspection with disassembly of concealing elements, such as e.g. ceilings, walls, floors for locating installed products is complicated and, in some instances, even of a destructive nature.

SUMMARY

It is therefore the object of the present invention to provide an effective method and a corresponding arrangement for the output of location-specific information, in particular in buildings. For example, some embodiments include a method for the output of location-specific information (OKI1), in particular in buildings (GB), on a mobile communication terminal (MG) of a user (B), comprising the following steps: (VS1) determining the location position of the mobile communication terminal (MG); and (VS2) providing location-specific information (OKI1) as a function of the location position on the mobile communication terminal (MG) by means of a server (S) connected via data technology with the mobile communication terminal (MG) and configured accordingly.

In some embodiments, the determination of the location position of the mobile communication terminal (MG) is carried out in that the user (B) uses a sensor device (K) of the mobile communication terminal (MG) to detect landmarks (M) and/or objects at the current location of the user and forwards the same to the server (S) for analysis and for determining the location position.

In some embodiments, the determination of the location position of the mobile communication terminal (M) is carried out in that the user (B) uses a SLAM scanner (K, AV) of the mobile communication terminal (MG) to detect landmarks and/or objects in the 3D point cloud at the current location of the user (B) and forwards the same to the server (S) for analysis and to determine the location position.

In some embodiments, the determination of the location position of the mobile communication terminal (MG) is carried out by means of a satellite-assisted position determination system (GPS) and/or by means of an indoor position determination system (IPS) and/or by means of mobile radio cell evaluation.

In some embodiments, the determination of the location position of the mobile communication terminal (MG) is carried out by the server (S), by analyzing the detected landmarks (M) and/or objects of the current location of the user (B).

In some embodiments, the provision of the location-specific information (OKI1) is carried out by the server (S) by the server (S) accessing corresponding entries of a database (DB).

In some embodiments, the location-specific information (OKI1) comprises visual and/or acoustic information relating to a corresponding subsection (GW) at the location position of the mobile communication terminal (MG).

In some embodiments, the location-specific information (OKI1) relating to the corresponding subsection (GW) is shown in the form of a timeline view (TLA) on the display (D) of the mobile communication terminal (MG).

In some embodiments, the location-specific information (OKI1) comprises visual and/or acoustic information relating to a future or planned subsection (GW) at the location position of the mobile communication terminal (MG).

In some embodiments, the method further comprises: detecting location-specific information (OKI2, OKI2') as a function of the location position with a sensor device (K, AV) of the mobile communication terminal (MG) and/or by means of a mobile building scanning device (SG); and transmitting the detected location-specific information (OKI2, OKI2') by means of the mobile communication terminal (MG) and/or by means of the mobile building scanning device (SG) via suitable communication links (KV1, KV2) to the server (S).

In some embodiments, location-specific information (OKI2, OKI2') is detected at defined time intervals by correspondingly configured scanning devices (SG) and/or by correspondingly configured mobile communication terminals (MG) and sent to the server (S).

As another example, some embodiments include a mobile communication terminal (MG), configured for carrying out a method as described herein.

As another example, some embodiments include a server (S) configured to carry out a method as described herein.

As another example, some embodiments include an arrangement for the output of location-specific information (OKI1), in particular in buildings (GB), on a mobile communication terminal (MG) of a user (B), wherein the location position of the mobile communication terminal (MG) is determined; and wherein as a function of the location position, the location-specific information (OKI1) can be provided on the mobile communication terminal (MG) by means of a server (S) connected via data technology with the mobile communication terminal (MG) and configured accordingly.

In some embodiments, location-specific information (OKI2, OKI2') can be detected as a function of the location position with a sensor device (K, AV) of the mobile communication terminal (MG) and/or by means of a mobile building scanning device (SG); and the detected location-specific information (OKI2, OKI2') can be transmitted to the server (S) by the mobile communication terminal (MG) and/or by the mobile building scanning device (SG) via suitable communication links (KV1, KV2).

BRIEF DESCRIPTION OF THE DRAWINGS

The example embodiments of the teachings of the present disclosure are explained in the example of the following figures, in which.

DETAILED DESCRIPTION

Figure 1:
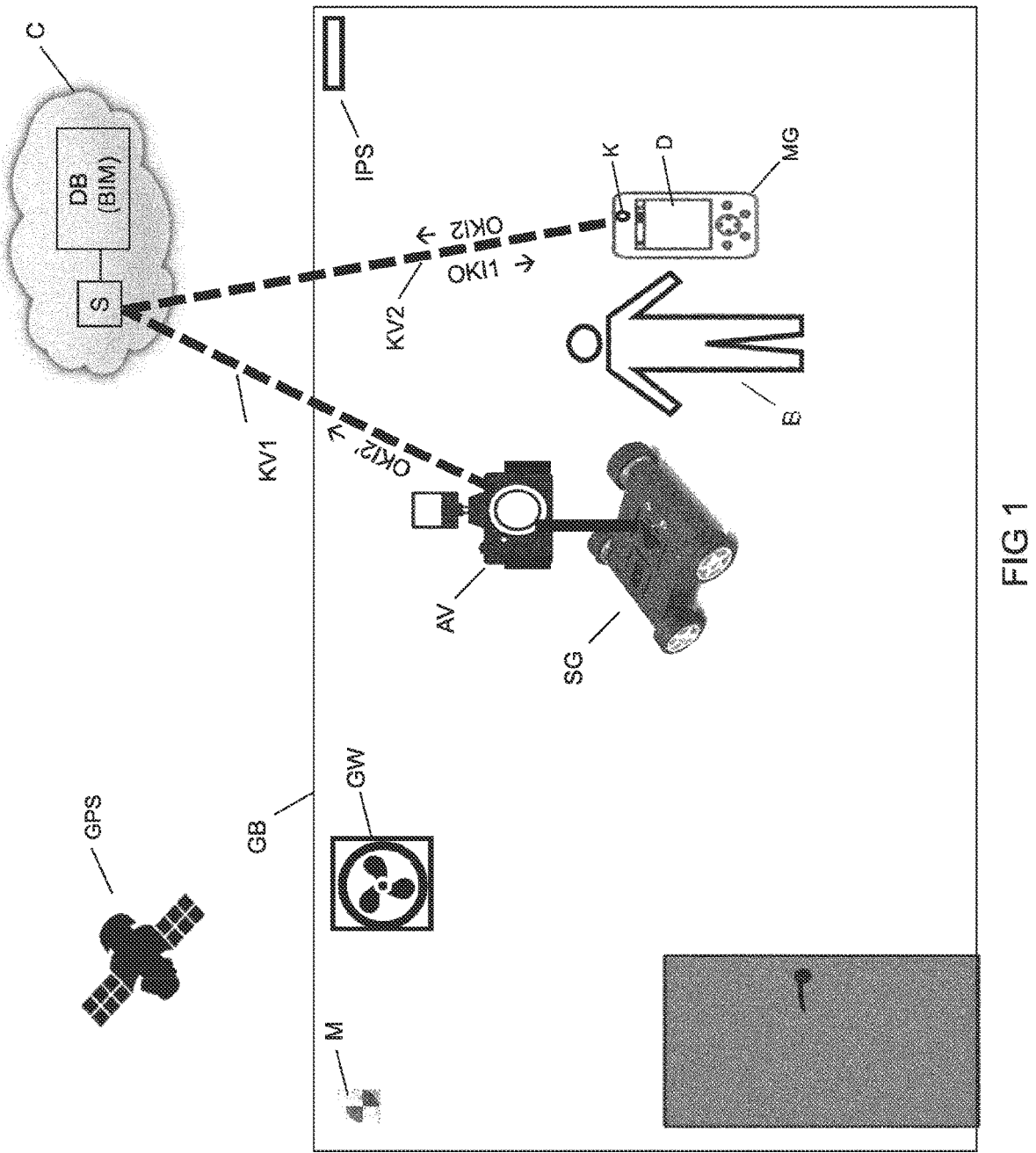
FIG. 1 shows an exemplary arrangement for the output of location-specific information, in particular in buildings, incorporating teachings of the present disclosure.

Some embodiments of the teachings of the present disclosure include methods for the output of location-specific information, in particular in buildings, on a mobile communication terminal (e.g. smartphone, tablet computer) of a user, comprising the following steps: determining the location position of the mobile communication terminal; and providing location-specific information as a function of the determined location position on the mobile communication terminal by means of a server connected via data technology with the mobile communication terminal and set up accordingly. For a subsection at a specific point in a building, technical and spatial information for service technicians, facility managers, tradespersons etc. can therefore be made available with simple means, i.e. without additional infrastructure.

In some embodiments, the mobile communication terminal is a portable mobile communication terminal, in particular a smartphone or a media player. Devices of this type have a digital camera, an output unit, a data memory and a processor connected thereto. The data memory is provided inter alia for the storage of applications. The latter can be loaded and executed by the processor. Portable mobile communication terminals are generally known. They can be a smartphone, such as e.g. the iPhone series by Apple, the Galaxy series by Samsung and the Lumia series by Nokia. Communication terminals of this type are also referred to as mobile telephones or as cellphones. The portable mobile communication terminals can also be what are known as tablet computers or tablet PCs, such as an iPad by Apple or a Galaxy Tab by Samsung. Furthermore, the communication terminals can be mobile media players, such as the iPod touch series by Apple or the Yepp series by Samsung.

These devices are also referred to as PMP for Portable Media Player. The portable mobile communication terminals by Apple cited in the introduction are typically based on an iOS operating system, the devices by Samsung on an Android operating system and the devices by Nokia on a Windows phone operating system. Corresponding software for the mobile communication terminal can be downloaded e.g. from an online internet sales portal for computer programs onto the mobile communication terminal and executed as an app on the portable mobile communication terminal.

In some embodiments, a method includes determining the location position of the mobile communication terminal in that the user uses a sensor device of the mobile communication terminal to detect landmarks and/or objects at the current location of the user and forwards the same to the server for analysis and in order to determine the location position. The image sensor can be a camera or a video camera, for instance. Another suitable sensor system of the mobile communication terminal can however also be used to determine the current location position.

In some embodiments, the determination of the location position of the mobile communication terminal is carried out in that the user uses a SLAM scanner (Simultaneous Localization and Mapping) of the mobile communication terminal to detect landmarks and/or objects in a 3D point cloud at the current location of the user and forwards the same to the server for analysis and in order to determine the location position. The SLAM scanner detects 3D data of objects (e.g. subsections) on site in the form of a 3D point cloud and advantageously forwards the same with a time stamp to the server. The server (computer with corresponding processing and storage means) advantageously analyzes the 3D point cloud and maps this into a digital building information model BIM, e.g. in the form of a digital volume model.

In some embodiments, the determination of the location position of the mobile communication terminal is carried out by a satellite-assisted position determination system (GPS) and/or by an indoor position determination system (beacons, WLAN) and/or by mobile radio cell evaluation. The determination of the location position of the mobile communication terminal can therefore take place by means of an infrastructure which already exists.

In some embodiments, the determination of the location position of the mobile communication terminal taking place using the server, by analyzing the detected landmarks and/or objects of the current location of the user. Landmarks can be markers or local points visibly attached in the building, which can be read in by a corresponding sensor system of the mobile communication terminal. In some embodiments, the markers or local points visibly attached in the building have been established by a corresponding referencing of official anchor points outside of the building. The referencing of official anchor points is carried out e.g. by a laser tachymeter or by means of triangulation.

In some embodiments, the provision of location-specific information is carried out by the server by the server accessing corresponding entries in a database (BIM/building database). A digitized building plan or a digital model (BIM, Building Information Model) of the corresponding building can be disposed in the database, for instance, with the respective location-specific information relating to the subsections in the building.

In some embodiments, the location-specific information comprising visual and/or acoustic information relating to a corresponding subsection at the location position of the mobile communication terminal. Technical information (manufacturer, type, variant, year of manufacture, last maintenance, etc.) relating to subsections installed at the location position is provided to the user on the display of a mobile communication terminal, for instance. The technical information can however also be provided to the user of the mobile communication terminal by an audio output (e.g. by way of a headset), e.g. in the form of a podcast or other audio file. Technical information of non-visible or concealed sub-sections (e.g. subsections behind walls, ceilings, floors) may be made available to the user on the mobile communication terminal.

In some embodiments, the location-specific information relating to the corresponding subsection is shown on the display of the mobile communication terminal in the form of a timeline view. In the form of a timeline viewer, individual construction stages can be shown in synchrony side by side, for instance. The individual construction stages or the phase of expansion (of the building or a subsection) are advanta-geously shown in chronological sequence in a timeline view. A view of the planned subsection or a planned building measure as a 3D model is advantageously shown in the timeline view. Stages of expansion (e.g. for defined dates of acceptance) of the subsection may be shown in the timeline view following on from or after the view of the planned subsection or a planned building measure.

In some embodiments, the location-specific information may include visual and/or acoustic information relating to a future/planned subsection at the location position of the mobile communication terminal. The server has access to corresponding plans or simulation results of suitable simu-lation programs. For a view "into the future", e.g. from a service technician or tradesperson point of view, an activity to be executed or result thereof can be shown in the timeline view as a simulated or modeled image (with or without overlays). This provides the executing tradesperson, for instance, with an idea of where the device to be installed is to be plugged and how the installation, possibly with con-nections, should finally look.

In some embodiments, the detection of location-specific information is a function of the location position with a sensor device of the mobile communication terminal and/or by means of a mobile building scanning device; and the transmission of the detected location-specific information uses the mobile communication terminal and/or by means of the mobile building scanning device to the server by way of suitable communication links.

In some embodiments, location-specific information is detected at defined time intervals by means of correspond-ingly configured scanning devices (e.g. NavVis scanner) and/or by means of correspondingly configured mobile communication terminals and being sent to the server. This can be used e.g. for a quality assurance of the building or subsections in the building. The data reported by the scan-ning devices to the server (e.g. in the form of a point cloud) is compared with the data already available in the server. By means of this target/actual comparison of the data, e.g. variations or wear and tear can be identified. The target/actual comparison is carried out by means of suitable software programs. The location-specific information sent to the server at defined time intervals is advantageously archived accordingly, (e.g. in a suitable database, e.g. an in-memory database or in a neural network) and analyzed (e.g. by means of artificial intelligence methods) (e.g. by means of machine learning (machine-based learning)). The location-specific information sent to the server at defined time intervals is advantageously stored in the form of digital knowledge graphs. With suitable analysis methods, state-ments can thus be made relating to the life cycle of a building or a subsection.

In some embodiments, a mobile communication terminal is configured to carry out the methods described herein. Nowadays, mobile communication terminals (e.g. smart-phones) are widely used and known to users in terms of their handling. No augmented reality glasses or corresponding training courses are therefore required.

In some embodiments, a server is configured to carry out the inventive method. The server can be located in the corresponding building (e.g. as an integral part of a building automation system). The server can however also be located in a cloud (computer cloud, data cloud), i.e. in a cloud IT infrastructure. By way of corresponding communication links (e.g. mobile radio, WLAN), the server can communi-cate with the mobile communication terminal (e.g. transfer data).

In some embodiments, there is an arrangement for the output of location-specific information, in particular in buildings, on a mobile communication terminal of a user, wherein the location position of the mobile communication terminal (e.g. smartphone, tablet computer) is determined; and location-specific information can be provided as a function of the location position on the mobile communi-cation terminal by means of a server connected via data technology to the mobile communication terminal and con-figured accordingly. The arrangement can be realized or implemented easily, since the required infrastructure (in particular the IT infrastructure) is typically already avail-able.

In some embodiments, location-specific information is detectable as a function of the location position with a sensor facility of the mobile communication terminal and/or by means of a mobile building scanning device; and the detected location-specific information can be transmitted to the server by means of the mobile communication terminal and/or by means of the mobile building scanning device by way of suitable communication links. By way of a suitable bidirectional communication (e.g. mobile radio) between the mobile communication terminal and the server, information can also be sent from the mobile communication terminal to the server. The database (iBase, database of installed sub-sections in a building) of the server can therefore be modi-fied or extended. In some embodiments, location-specific information can therefore be reported to the server at defined time intervals or after conversion work.

FIG. 1 shows an exemplary arrangement for the output of location-specific information OKI1, in particular in build-ings GB, on a mobile communication terminal MG (e.g. smartphone or tablet computer) of a user (e.g. service technician, facility manager, architect), wherein the location position of the mobile communication terminal MG is determined; and wherein location-specific information OKI1 can be provided as a function of the location position on the mobile communication terminal MG by a server S connected via data technology with the mobile communi-cation terminal MG and configured accordingly.

The location-specific information OKI1 can be e.g. a subsection GW installed or plugged into a building GB, e.g. cables, distributors, tubes, valves, HVAC infrastructure (heating, ventilation, air conditioning). These subsections GW are often not directly visible, since they are generally installed behind a cladding, behind a wall or behind a ceiling or below a floor.

As a function of the location position of the mobile communication terminal MG, i.e. of the current position, where the mobile communication terminal MG is currently located, information relating to subsections GW which are also located at the current position (e.g. a room, floor in a building GB) of the mobile communication terminal MG is provided on the display D of the mobile communication terminal MG.

The location position of the mobile communication terminal MG can be determined in that the user B uses a sensor device K (e.g. image sensor, camera) of the mobile communication terminal MG to detect landmarks M and/or objects at the current location of the user B and forwards the same to the server S for analysis and to determine the location position. Landmarks M are attached in a building GB in such a way that they can be detected or read out by a suitable sensor device K. The respective site of the landmarks M is stored in a building plan or a building model (BIM, building information model) in a suitable notation. A landmark M of a building GB may be referenced by an official anchor point (geodetic reference point) of a community or locality. This can take place by means of measurement with a tachymeter.

The determination of the location position of the mobile communication terminal MG can also take place in that the user B uses a SLAM scanner K of the mobile communication terminal MG to detect landmarks M and/or objects in the 3D point cloud at the current location of the user B and forwards the same to the server S for analysis and to determine the location position. SLAM is understood to mean simultaneous position determination and mapping. This is carried out by means of a suitable recording or scanning sensor system of the mobile communication terminal MG and by means of suitable software for evaluating the point cloud supplied by the sensor system.

The determination of the location position of the mobile communication terminal MG can further take place by means of a satellite-assisted position determination system GPS and/or by means of an indoor position determination system IPS (e.g. with iBeacons, WLAN, RFID) and/or by means of mobile radio cell evaluation (e.g. GSM). Mixed or combined methods can also be used to determine the location position of the mobile communication terminal MG.

The server S (computer with corresponding processing and storage means, and corresponding software) makes available the corresponding location-specific information OKI1 as a function of the respective location position of the mobile communication terminal MG for the mobile communication terminal MG, e.g. by outputting the information on the display D and/or by suitable audio information. The server S may be connected via data technology with corresponding position determination systems. The communication between the server S and the mobile communication terminal MG is carried out by way of a suitable communication link KV2 (e.g. by way of a corresponding radio link). The server S makes available the location-specific information OKI1 by accessing a corresponding database DB. The location-specific information in a corresponding building information model BIM may be stored in the database DB, e.g. in an in-memory database, which enables rapid access. The server S may be realized in a cloud infrastructure C. The building information model BIM comprises a virtual image (digital twin) for the corresponding building GB. The building information model BIM can be stored e.g. in IFC notation (Industry Foundation Classes, open standard in the building industry for digitally describing building models) in the database DB. The building information model BIM can be stored or saved e.g. in the form of a digital volume model.

Location-specific information OK12, OK12' can further be detected as a function of the location position with a sensor device K of the mobile communication terminal MG and/or by means of a mobile building scanning device (e.g. scanning trolleys by the company NavVis) SG with a corresponding recording apparatus AB; and the detected information OK12, OK12' can be transmitted by the mobile communication terminal MG and/or by the mobile building scanning device SG by way of suitable communication links KV1 (e.g. suitable radio link) to the server S for a digital further processing. The building information model BIM may be updated with the location-specific information OK12, OK12' reported to the server. An optimized and efficient creation or updating of a digital twin can inter alia therefore take place for a building GB.

If the location-specific information OK12, OK12' is sent to the server S in the form of a point cloud or a point cloud file, this can be translated or converted by a corresponding converter into the notation of the building information model (BIM model).

The mobile communication terminal MG may be equipped with a corresponding app for communication with the server S and provision of the information supplied by the server.

The identification of objects or landmarks is of significant importance in many application scenarios in image processing. There is no one general solution which supplies good results for all application areas. The requirements and framework conditions are too varied. For the various application areas, specialized methods are used in most cases, which fulfil the specific requirements or require the specific properties of the application scenario.

One method used very frequently in image processing to identify objects is the search for characteristic shapes. The evaluation of the shape of an object is generally carried out on binary images, in which the object is segmented. The binary image is obtained for instance with the aid of edge-based binarization methods. A known algorithm which carries out an edge-based binarization is the Canny algorithm. Furthermore, other algorithms use different operators and methods for identifying edges. If the contour of the landmark in the binary image is segmented, the shape can be examined. Depending on the complexity of the shape, different methods are used. The generalized Hough transformation can be used with landmarks which can be easily described geometrically, such as for instance rectangular or circular structures.

If the shape is not able to be described mathematically or only with difficulty, then what are known as templates or reference images are used. A template is a pattern which corresponds to the shape of the sought pattern. For the detection of the object, a measure is calculated of the similarity between the contour and the template. If the measure is in a specific acceptance range, the object is identified. In most application areas, an object is represented by many templates, which represent it in different scalings and rotations. Other methods detect significant points and in addition produce a description for these points, what is known as a point descriptor. The point descriptor makes it possible to compare significant points with one another and to reidentify a significant point in another image. This ability predestines this method for use in identifying landmarks.

The position of a person with a mobile communication terminal (smartphone or tablet) in an object is identified with the previously described method on the basis of the environment, by the image index being detected and compared with the associated reference file (template). The desired location-specific building and object information is then provided. This comprises information relating to objects such as control elements, documentation for installed devices, service history, concealed installations etc. installed or positioned at the position, if available.

Furthermore, the system can be enhanced with acquired information by way of the mobile communication terminal. For example with photos of an "open wall/ceiling", installed objects which are subsequently available to other users as historical information. Furthermore, a "future image" can be shown after identifying the position and object to be observed. This can be e.g. a modeled, simulated or augmented image of the current state. It can also be produced from a rendered 3D model. An onsite inspection with complicated disassembly of concealed elements, such as e.g. ceiling, walls or floors, is omitted. As a result, clear documentation of the work to be expected is possible, for instance.

Figure 2:
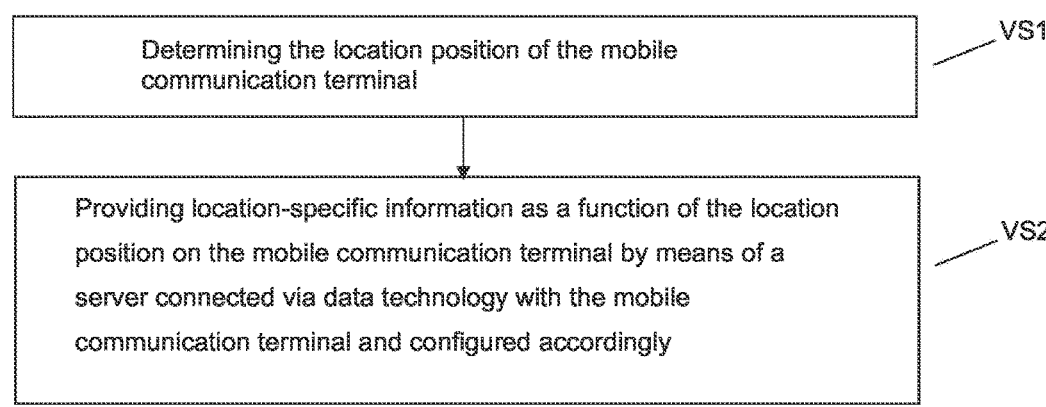
FIG. 2 shows an exemplary flow chart for a method for the output of location-specific information, in particular in buildings, incorporating teachings of the present disclosure.

FIG. 2 shows an exemplary flow chart for a method for the output of location-specific information, in particular in buildings, on a mobile communication terminal of a user. The method comprises the following steps: (VS1) determining the location position of the mobile communication terminal; and (VS2) providing location-specific information as a function of the location position on the mobile communication terminal by means of a server connected via data technology with the mobile communication terminal and configured accordingly.

The determination of the location position of the mobile communication terminal may be carried out in that the user uses a sensor device of the mobile communication terminal to detect landmarks and/or objects at the current location of the user and forwards the same to the server for analysis and to determine the location position. The determination of the location position of the mobile communication terminal may be carried out in that the user uses a SLAM scanner of the mobile communication terminal to detect landmarks and/or objects in the 3D point cloud at the current location of the user and forwards the same to the server for analysis and to determine the location position.

The determination of the location position of the mobile communication terminal is advantageously carried out by a satellite-assisted position determination system and/or by an indoor position determination system and/or by mobile radio cell evaluation.

The determination of the location position of the mobile communication terminal is advantageously carried out by the server, by analyzing the detected landmarks and/or objects of the current location of the user.

The provision of the location-specific information may be carried out by the server, by the server accessing corresponding entries of a database, e.g. of an in-memory database. This permits rapid access to the database entries. The location-specific information may comprise visual and/or acoustic information relating to a corresponding subsection at the location position of the mobile communication terminal. The location-specific information relating to the corresponding subsection may be shown on the display of the mobile communication terminal in the form of a timeline view. By scrolling or "swiping", a user can navigate in the timeline view.

In some embodiments, the location-specific information comprises visual and/or acoustic information relating to a future/planned subsection at the location position of the mobile communication terminal. The method also optionally comprises the following steps: detecting location-specific information as a function of the location position with a sensor device of the mobile communication terminal and/or by means of a mobile building scanning device; and transmitting the detected location-specific information by means of the mobile communication terminal and/or by means of the mobile building scanning device by way of suitable communication links to the server.

The location-specific information is optionally detected at defined time intervals by means of correspondingly configured scanning devices (e.g. scanning trolleys by the company NavVis) and/or by means of correspondingly configured mobile communication terminals and sent to the server.

The methods described herein can be realized with correspondingly configured hardware and software components (e.g. processor unit, storage means, input/output units, software programs). Furthermore, the method can be realized with commercial components or an infrastructure which already exists.

Exemplary Scenario for Carrying Out an Example Method:

1. Image Acquisition

The user of the mobile client app takes a photo of his current environment.

2. Feature Identification and Extraction

The photo is sent from the mobile client to the server (e.g. indoor location server). Once the recorded image has been transmitted to the server, features are identified and extracted.

3. Feature Matching

The calculated image feature descriptor is compared with the entries in the reference database. The best match is selected.

4. Localization

Since spatial information is available for the entries in the reference database, the location of the best selected match from step 3 is fed back to the user.

The methods described herein make it possible to call up location—specific environmental information for a user and to carry out corresponding actions. Building upon the current location position ("where") uses e.g. a visual index. A recorded photo or also a photo shown live in a camera application on a mobile terminal is compared with the photos of the image database (on-/offline) of the building by means of the server. In the case of a live camera image, a "live image" (screenshot; photo file) should be taken in the background, ideally without user interaction in order to keep the process as simple as possible, which is then used for comparison with the image database of the building. With this "live image", a photo is always produced after a time x (e.g., after two to three seconds) if the live camera is directed at a specific object or scene. Furthermore, instead of individual photos, series of similar photos (=almost same position video) can be used for the position determination. Once the image comparison and thus the position determination has concluded successfully, the user now has a number of options which are made available to him on the mobile communication terminal (e.g. smartphone or tablet computer) within an app or browser or similar application.

Subsection views (ideally as overlays on the image just created or observed, such as power cables, network cables, water pipes etc.) from the building environment can be shown on the mobile communication terminal (e.g. smartphone or tablet computer). This selection is then shown overlaid on the display in a location-specific manner, in other words precisely where the user is currently located. In addition to the overlay representations, historical 3D image or photo material can also be accessed, in order to visualize how the region of interest to a user previously looked, e.g. an office corridor without a false ceiling. Depending on user interest, further technical plans and information can now be shown or provided for download. These representations can be overlaid on the current photo or also shown separately therefrom on the monitor. These could be e.g. working instructions or working documentation from history. The representation of plans and images at the site with a view into the future in terms of how the installation or rebuilding should be seen after work has concluded is innovative.

The representation can be carried out in the form of a timeline viewer, which shows e.g. individual construction stages in synchrony adjacent to one another. For a view "into the future" (from a service/tradesperson point of view the activity to be carried out, or the result thereof), a simulated or modeled image with or without overlays is shown in the timeline view. This presents the executing tradesperson with a view of how the installation should finally look.

Figure 3:
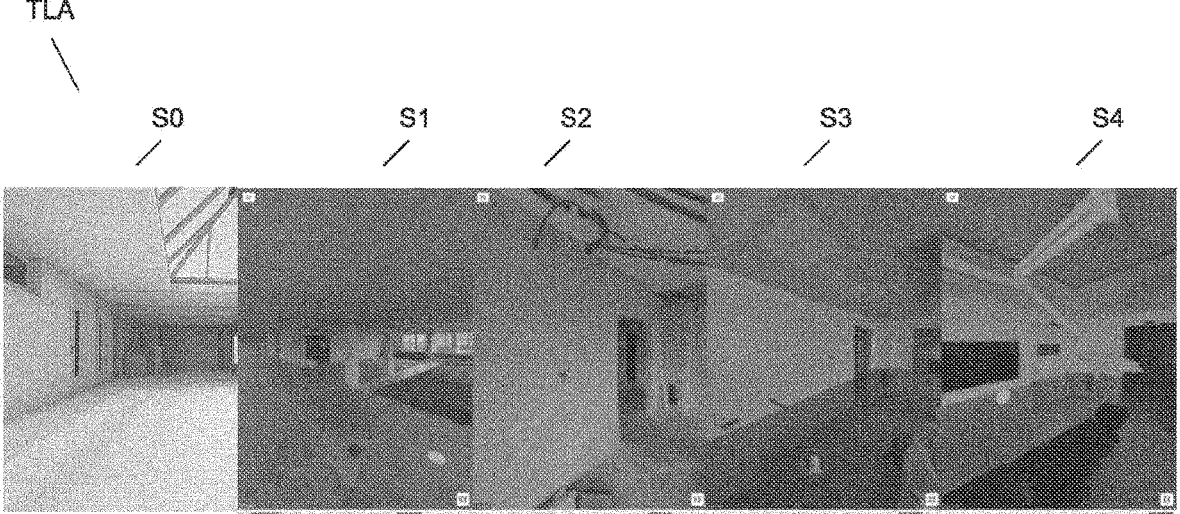
FIG. 3 shows an exemplary representation of the stages of expansion of the building in a timeline view incorporating teachings of the present disclosure.

FIG. 3 shows an exemplary representation in timeline view TLA e.g. on a display of a mobile communication terminal (e.g. smartphone). In a timeline view TLA, a user can observe e.g. a subsection in different time representations (views) S0-S4. The representations (views) S0-S4 are advantageously ordered chronologically. S0 shows a view of the planned subsection or a planned building measure as a 3D model. This is produced from the 3D modeling/visualizations of a component-oriented building model. S1-S4 shows the temporal building phases of the building scan. The views S0-S4 may be synchronized locally and therefore show the same location or location section in the building at different phases of expansion. The 3D model can be generated with a CAD program (e.g. Revit) and stored in the corresponding notation on the server. The 3D model can however also be generated or stored from an IFC (Industrial Foundation Classes) or BIM model.

Exemplary Advantages of the Methods Described Herein:

Easy-to-use solution for operator.

No expensive hardware (e.g. AR glasses) required.

Unlike augmented reality applications, the desired object need not be "tracked", i.e. this involves fading in context-relevant information without continuously holding the smartphone and its camera on the object of interest. This involves a unique identification, since the smartphone can be used in a user-friendly manner in each further "normal" position. This can also be decoupled temporally.

Representation of plans and images at the site with a view into the future possible in order to obtain an impression of how the installation or conversion is to look after completion of the work.

Less cost and time outlay on site on a service/job site in order to find the correct assembly site.

Avoidance of long searching and errors.

View into the past and/or future (timeline view) prevents errors and misinterpretation of execution. The efficiency is therefore increased and the executing worker is assisted with his activity.

After position determination and thus also object identification, the desired information can be retrieved from a server which provides the relevant information (e.g. facility management system, BIM database, etc.).

In principle, one could identify in a train what a service technician is currently looking at with the smartphone and provide the associated plans or instructions. In an ad hoc manner on site in the train, a train conductor could photograph abnormalities; these photos are then compared with the server, so that not only one photo document exists but instead a more detailed document with context-relevant information relating to the site, the history and a product etc.

REFERENCE CHARACTERS

GPS, IPS Position determination system
M Marker

GB Building
GW Subsection
C Cloud
S Server
DB Database
BIM Building information model
KV1, KV2 Communication link
B Operator
MG Mobile device
D Display
AV, K Recording apparatus
SG Scanning device
OKI1, OKI2, OKI2' Location-specific information
VS1, VS2 Method step
TLA Timeline view
S0-S4 View

What is claimed is:

1. A method for the output of location-specific information within a building on a mobile communication terminal of a user, the method comprising:

detecting landmarks at a location of the mobile communication terminal using a sensor, wherein the landmarks include visible markers attached to an interior of the building;

sending the detected landmarks to a server connected via data technology with the mobile communication terminal;

analyzing the detected landmarks to determine the location of the mobile communication terminal at the server;

providing location-specific information as a function of the location of the mobile communication terminal from the server to the mobile communication terminal, wherein the location-specific information comprises acoustic information relating to a corresponding subsection at the location position of the mobile communication terminal; and displaying the location-specific information relating to the corresponding subsection in a timeline view on a display of the mobile communication terminal including.

2. The method as claimed in claim 1, wherein detecting landmarks at a location of the mobile communication terminal using a sensor includes using a SLAM (Simultaneous Localization and Mapping) scanner to detect the landmarks or objects in the 3D point cloud at the current location of the user.

3. The method as claimed in claim 1, wherein determination of the location of the mobile communication terminal includes using a satellite-assisted position determination system, an indoor position determination system, or a mobile radio cell evaluation.

4. The method as claimed in claim 1, wherein provision of the location-specific information is carried out by the server and includes accessing corresponding entries of a database.

5. The method as claimed in claim 1, wherein the location-specific information comprises visual information relating to a corresponding subsection at the location position of the mobile communication terminal.

6. The method as claimed in claim 5, further comprising displaying the location-specific information relating to the corresponding subsection in a timeline view on a display of the mobile communication terminal.

7. The method as claimed in claim 5, wherein the location-specific information comprises visual or acoustic information relating to a future or planned subsection at the location position of the mobile communication terminal.

8. The method as claimed in claim 1, further comprising:

detecting location-specific information as a function of the location position with a sensor device of the mobile communication terminal or with a mobile building scanning device; and transmitting the detected location-specific information using the mobile communication terminal and/or the mobile building scanning device via suitable communication links to the server.

9. The method as claimed in claim 8, further comprising detecting location-specific information at defined time intervals by correspondingly configured scanning devices or by correspondingly configured mobile communication terminals and sending the information to the server.

10. A computing device comprising:

a memory storing a set of instructions; and a processor configured to access the set of instructions in the memory;

wherein the set of instructions, when loaded and executed causes the processor to: detect landmarks at a location of the mobile communication terminal within a building using a sensor, wherein the landmarks include visible markers attached to an interior of the building;

send the detected landmarks to a server connected via data technology with the mobile communication terminal;

analyze the detected landmarks to determine the location of the mobile communication terminal at the server; and provide location-specific information as a function of the location of the mobile communication terminal from the server to the mobile communication terminal, wherein the location-specific information comprises acoustic information relating to a corresponding subsection at the location position of the mobile communication terminal; and displaying the location-specific information relating to the corresponding subsection in a timeline view on a display of the mobile communication terminal.

11. The computing device of claim 10, wherein the instructions further cause the processor to:

determine a location position of the mobile communication terminal; and provide, as a function of the location position, the location-specific information on the mobile communication terminal using a server connected via data technology with the mobile communication terminal and configured accordingly.

12. The computing device as claimed in claim 11, further comprising a sensor detecting location-specific information as a function of the location position or using a mobile building scanning device; and wherein the detected location-specific information can be transmitted to the server by the mobile communication terminal or by the mobile building scanning device via suitable communication links.

13. A method for the output of location-specific information within a building on a mobile communication terminal of a user, the method comprising:

detecting landmarks at a location of the mobile communication terminal using a sensor;

sending the detected landmarks to a server connected via data technology with the mobile communication terminal;

analyzing the detected landmarks to determine the location of the mobile communication terminal at the server; and providing location-specific information as a function of the location of the mobile communication terminal from the server to the mobile communication terminal, wherein the location-specific information comprises acoustic information relating to a corresponding subsection at the location position of the mobile communication terminal; and displaying the location-specific information relating to the corresponding subsection in a timeline view on a display of the mobile communication terminal.

14. The method as claimed in claim 13, wherein detecting landmarks at a location of the mobile communication terminal using a sensor includes using a SLAM (Simultaneous Localization and Mapping) scanner to detect the landmarks or objects in the 3D point cloud at the current location of the user.

15. The method as claimed in claim 13, wherein determination of the location of the mobile communication terminal includes using a satellite-assisted position determination system, an indoor position determination system, or a mobile radio cell evaluation.

16. The method as claimed in claim 13, wherein provision of the location-specific information is carried out by the server and includes accessing corresponding entries of a database.

17. The method as claimed in claim 13, further comprising:

detecting location-specific information as a function of the location position with a sensor device of the mobile communication terminal or with a mobile building scanning device; and transmitting the detected location-specific information using the mobile communication terminal or the mobile building scanning device via suitable communication links to the server.

18. The method as claimed in claim 17, further comprising detecting location-specific information at defined time intervals by correspondingly configured scanning devices or by correspondingly configured mobile communication terminals and sending the information to the server.

* * * * *